Patented May 27, 1930

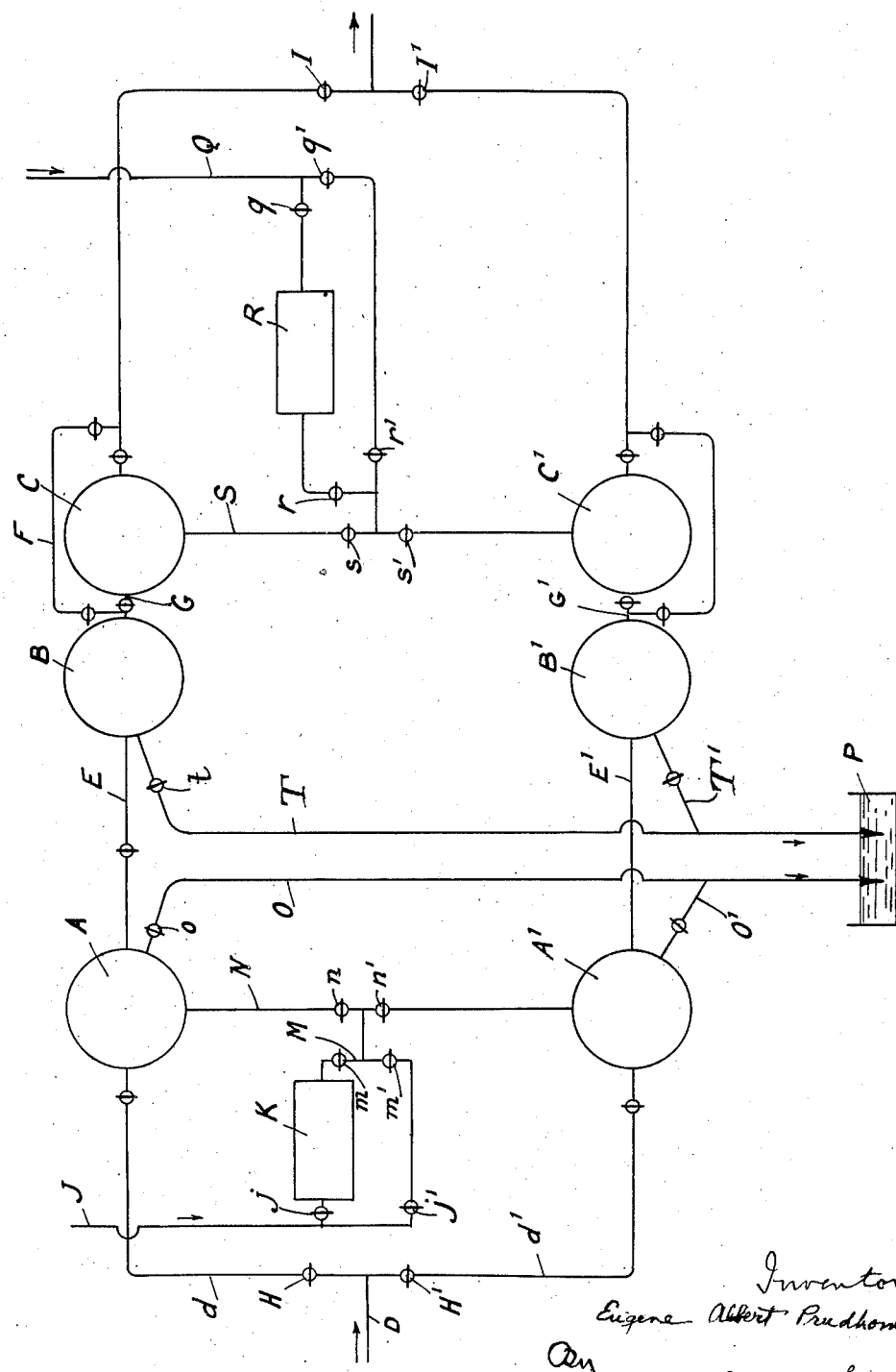

1,760,522

UNITED STATES PATENT OFFICE

EUGÈNE ALBERT PRUDHOMME, OF NEUILLY-SUR-SEINE, FRANCE, ASSIGNOR TO SOCIETE INTERNATIONALE DES PROCEDES PRUDHOMME (S. I. P. P.), OF PARIS, FRANCE, A LIMITED JOINT STOCK COMPANY OF FRANCE

PROCESS AND APPARATUS FOR PURIFYING GASES

Application filed April 7, 1926, Serial No. 100,462, and in France March 4, 1926.

The present invention relates to processes and apparatuses for the hot desulphurization of gases derived from the distillation or the pyrogenation of solid, liquid or other combustibles.

The applicant has recognized and has already drawn attention, in prior patents, to the vital importance of purifying, principally the desulphurization of such gases before they are submitted to the action of catalysts, in the presence eventually of additional gases, and with a view to their enrichment and their reduction in density for the formation of synthetic liquid fuels. Catalysis without prior purification is practically inoperative, for the reason that the catalysts rapidly become contaminated ceasing then to exercise the catalytic action which is required of them. In particular when with a view to a polymerizing and fixation action of hydrogen, catalysts are employed, as in the Prudhomme processes, in a cycle of operations wherein the maintenance of a constant temperature preventing any condensation of tars is indispensable, the efficient purification, before catalysis, is imperative.

The invention relates to means for ensuring such a purification before catalysis, in a methodical manner, with the desired temperature conditions.

The problem of the elimination of sulphur, the principal object of the purification, is complex. It is necessary not merely to operate in a manner to retain the inorganic sulphur, but it is necessary to retain the organic sulphur, in the presence or in the absence of steam according to the nature of the combustibles treated; provided that this result does not cause by some manner or other a chemical alteration of the gases or vapours thus desulphurized. Finally practically, it is necessary that the installation provided be such as to permit a continuous industrial operation and the recuperation of the sulphur in a commercial form.

According to the invention, a practical solution of this complex problem is obtained, in principle, by the following means:—

The gases or vapours to be desulphurized are conducted through a plurality of purifiers connected in series, in such a manner as to permit, separately and successively, the retention of the inorganic sulphur and of the organic sulphur, at a temperature sufficiently slightly elevated thus to avoid, by an inadmissible elevation of temperature, any action capable of producing a disturbance of the chemical equilibrium of the desulphurized hydrocarbons. The new principle is therefore to be perceived in the combined employment of purifiers in series, each having a definite function, in combination with the maintenance of a temperature sufficiently slightly elevated to avoid any disturbance of the chemical equilibrium of the desulphurized bodies.

In practice the purifiers in series are employed in two parallel groups, the plant thus permitting continuous operation, by regeneration of the purifiers of the one group during the run of the other.

The accompanying drawing shows, diagrammatically, a plant capable of serving at will for the purification of gases containing or not containing steam, and the regeneration in a continuous operation of the purifiers.

As shown on the drawing, the installation comprises two parallel groups of purifiers, A, B, C and $A^1$, $B^1$, $C^1$. The gases to be purified coming from producer apparatuses by a pipe D, are led to the purifiers A, B, C by a pipe $d$ whilst the purifying masses of the apparatuses $A^1$, $B^1$, $C^1$ are being regenerated or, alternatively, to these latter, by a pipe $d^1$, whilst regeneration is being effected in A—B—C.

In these two batteries of apparatuses the purifiers on admission A, $A^1$ are charged with a substance such as finely divided oxides of nickel placed upon a porcelain or other support (clinker, pumicestone, porous earth), these finely divided oxides having for their function the retention more particularly of the inorganic sulphur. On leaving the apparatuses A, $A^1$ the gases are led by E or $E^1$ to the purifiers B or $B^1$ charged with oxides of copper, iron or other suitable metal, placed on a similar support, these oxides being in all cases adapted to retain all the organic sulphur leaving or remaining in the gases to be purified.

If the gases to be purified are free from steam, their passage through the two purifiers in series A, B or A¹, B¹ effects their complete purification, this division of the purification into two steps permitting as has been stated, the conservation, in the apparatuses, of a temperature which ensures the maintenance of the chemical equilibrium of the gases to be purified.

If, on the contrary, the gases to be purified contain steam, such steam in acting on the copper or other sulphides formed in B and B¹ by the combination of the purifying metal with the organic sulphur, may reform sulphuretted hydrogen.

In order to ensure the separation of the sulphur out of the reformed $H_2S$, the gases to be purified are caused, according to the invention, to pass by a pipe (G or G¹) into a third purifier (C or C¹) charged like the first of the series (A or A¹) with material capable of retaining the inorganic sulphur, thus freeing the hydrogen from the reformed sulphuretted hydrogen.

It may here be remarked that the step by step purification and the maintenance of a suitably reduced temperature (250° C. for example) enables purification to be effected whilst however avoiding condensation of the vapours, in the apparatuses, by the condition that precautions are taken in order that those of the vapours which normally would be likely to condense at such temperature, are mechanically entrained, by virtue of a sufficient velocity conveyal obtained either by a suitable formation of the apparatuses and pipes, or by the addition of carrier vapours or gases (steam or water gas, for example).

The regeneration of the battery of purifiers A, B, C for example, can be effected as follows:—

The admission cock H leading to A—B—C, is closed whilst the admission cock H¹ to the purifiers A¹—B¹—C¹ previously regenerated is opened. Obviously the delivery cock I for the purified gases is closed and I¹ opened.

Regeneration can be carried out in the known manner, by means of a current of air, the air being caused, according to the invention, to be passed previously through a heater; it can be effected equally well, according to the invention, by means of a current of water gas charged with steam having passed previously through a heater maintained at a temperature of about 350° C.

In the example shown, provision has been made for the simultaneous employment of both these two means, that is to say, regeneration by heated air for the apparatuses A and by heated water gas, for the apparatuses B and C.

The air is admitted by a pipe J, provided with a cock then open, into a heater K, from whence it is directed, through an open cock m, pipe M, open cock n and pipe N, into the purifying element A, from which the sulphur is removed, the sulphur dioxide formed leaving by the pipe O, the cock o then being open. The $SO_2$ formed is collected in a vat P charged with water.

Water gas is likewise led, by a pipe Q, and through an open cock q, to a heater maintained at a temperature of about 350° C., and, the cocks r and s being open, such gas traverses the elements B and C where the sulphur is removed from the sulphides, the sulphuretted hydrogen which is formed being conducted through an open cock t and pipe T, into the vat P. During this operation of regeneration, the temperature rises in the elements A, B and C; this is why it is necessary to bring these back before they are set in operation, to the normal temperature of purification, which is about 250° C. This result is obtained by cutting out the heater, by closure of the cocks j, m, q, r and by passing through the elements a stream of cold gas admitted by J and Q and led to the said elements by J—N and Q—S respectively, the cocks j¹, n¹ and q¹, r¹ being open.

It can be seen that the elements A, B, C being reset in operation, the regeneration in the elements A¹, B¹, C¹ which were then in operation can be proceeded with, this being effected by a suitable setting of the series of cocks.

A pipe F is provided in shunt around the last purifier C and C¹ for the purpose of cutting out by the closure of suitable cocks this last purifier when the gases to be treated do not contain steam.

Claims:

1. A continuous process for desulphurization of gases which consists in heating said gases successively in the presence of nickel oxide to remove mineral sulphur therefrom and in the presence of copper oxide to remove organic sulphur therefrom.

2. Apparatus of the class described comprising a plurality of purifying elements arranged in series, means connecting said elements for conducting gases therebetween, and regenerating means including a plurality of heaters and means connecting each of said heaters with separate elements for separately delivering regenerating fluid to the latter.

3. Apparatus of the class described comprising a plurality of purifying elements, means connecting said elements in series, a by-pass for the last element of the series, and regenerating means for said elements including a plurality of heaters, means connecting one of said heaters with the first element and one with the last element for conducting regenerating fluid thereto, a by-pass for each of said heaters, and means conducting said regenerating fluid from said elements.

4. Apparatus of the class described comprising at least three purifying elements connected in series, heaters connected to the first and last elements of said series for conducting regenerating fluid thereto, and means connected to the first and intermediate elements for conveying regenerating fluid therefrom.

5. Apparatus of the class described comprising parallel series of purifying elements, a by-pass for the last element of each series, and means for regenerating said elements including a plurality of heaters and means connecting each of said heaters with one of said elements of each series for separately conducting regenerating fluid thereto.

6. Apparatus of the class described comprising parallel series of purifying elements, a by-pass for the last element of each series, and means for regenerating one of said series of elements while the other series is operating, said means including a plurality of heaters, means connecting each of said heaters to separate elements of each series, and delivery conduits connected to each series.

7. Apparatus for the purification of gases comprising parallel series of purifying elements, a by-pass for the last element of each series, and regenerating means including a pair of heaters, one of said heaters being connected to the first element of each series and one to the last element of each series, a by-pass for each heater, delivery conduits connected to elements of each series, and a water bath, said delivery conduits being adapted to deliver regenerating medium from said elements to said water bath.

In testimony whereof I have signed this specification.

EUGÈNE ALBERT PRUDHOMME.